(12) United States Patent
Jassal et al.

(10) Patent No.: US 10,193,427 B2
(45) Date of Patent: Jan. 29, 2019

(54) METHOD OF FABRICATING ELECTRIC MACHINE LAMINATIONS USING ADDITIVE MANUFACTURING

(71) Applicant: GENERAL ELECTRIC COMPANY, Schenectady, NY (US)

(72) Inventors: Anoop Jassal, Munich (DE); Jan Erich Hemmelmann, Baldham (DE); Mohamed Osama, Garching (DE)

(73) Assignee: GENERAL ELECTRIC COMPANY, Schenectady, NY (US)

( * ) Notice: Subject to any disclaimer, the term of this patent is extended or adjusted under 35 U.S.C. 154(b) by 494 days.

(21) Appl. No.: 14/955,121

(22) Filed: Dec. 1, 2015

(65) Prior Publication Data
US 2017/0155309 A1     Jun. 1, 2017

(51) Int. Cl.
| | | |
|---|---|---|
| *B22F 3/00* | (2006.01) | |
| *H02K 15/02* | (2006.01) | |
| *B22F 3/16* | (2006.01) | |
| *B22F 3/24* | (2006.01) | |
| *B23K 26/342* | (2014.01) | |

(Continued)

(52) U.S. Cl.
CPC ............. *H02K 15/024* (2013.01); *B22F 3/16* (2013.01); *B22F 3/24* (2013.01); *B23K 15/0086* (2013.01); *B23K 15/0093* (2013.01); *B23K 26/0006* (2013.01); *B23K 26/082* (2015.10); *B23K 26/342* (2015.10); *B23K 26/702* (2015.10); *C22C 33/02* (2013.01); *H02K 15/00* (2013.01); *H02K 15/02* (2013.01); *H02K 15/12* (2013.01); *B22F 2005/004* (2013.01); *B22F 2998/10* (2013.01); *B22F 2999/00* (2013.01); *B23K 2101/36* (2018.08); *B23K 2103/02* (2018.08);

(Continued)

(58) Field of Classification Search
CPC ...... H02K 15/02; H02K 15/024; H02K 15/12; B22F 3/16; B22F 3/24
USPC ...................................................... 419/26, 48
See application file for complete search history.

(56) References Cited

U.S. PATENT DOCUMENTS

| | | |
|---|---|---|
| 4,155,397 A | 5/1979 | Honsinger et al. |
| 4,658,846 A | 4/1987 | Johnson |

(Continued)

FOREIGN PATENT DOCUMENTS

WO     2012175476 A2     12/2012

OTHER PUBLICATIONS

Bang, D, "Design of Transverse Flux PM Machines for Large Direct-Drive Wind Turbines," Busan, Korea; Master of Engineering, Pukyong National University, 2010 ISBN 978-90-5335-36-3.

(Continued)

*Primary Examiner* — Mark A Chapman
(74) *Attorney, Agent, or Firm* — GE Global Patent Operation; Nitin Joshi (57) ABSTRACT

A method of making a component of a radial or axial flux electrical machine is provided. An additive manufacturing process is used to manufacture a plurality of laminas, including applying beams of energy to a successive plurality of ferromagnetic material particles and fusing them together to form a ferromagnetic helix or spiral, disposing an insulating material on said ferromagnetic helix or spiral, compressing the ferromagnetic helix or spiral to form a compressed ferromagnetic helix or spiral, and fixing the compressed ferromagnetic helix or spiral. A method of making a component of a transverse flux electrical machine is provided, including using an additive manufacturing process.

22 Claims, 10 Drawing Sheets

(51) Int. Cl.
  *B23K 26/00* (2014.01)
  *B23K 15/00* (2006.01)
  *H02K 15/12* (2006.01)
  *H02K 15/00* (2006.01)
  *C22C 33/02* (2006.01)
  *B23K 26/70* (2014.01)
  *B23K 26/082* (2014.01)
  *B33Y 10/00* (2015.01)
  *B33Y 80/00* (2015.01)
  *B22F 5/00* (2006.01)
  *B23K 101/36* (2006.01)
  *B23K 103/02* (2006.01)
  *B23K 103/04* (2006.01)

(52) U.S. Cl.
  CPC ......... *B23K 2103/04* (2018.08); *B33Y 10/00* (2014.12); *B33Y 80/00* (2014.12)

(56) References Cited

U.S. PATENT DOCUMENTS

| | | | |
|---|---|---|---|
| 5,045,742 | A | 9/1991 | Armstrong et al. |
| 6,365,999 | B1 | 4/2002 | Muehlberger et al. |
| 7,146,708 | B2 | 12/2006 | Reiter, Jr. et al. |
| 7,498,080 | B2 | 3/2009 | Tung et al. |
| 7,640,648 | B1 | 1/2010 | Rittenhouse |
| 8,383,985 | B2 | 2/2013 | Twelves, Jr. et al. |
| 8,729,766 | B2 | 5/2014 | Reutlinger et al. |
| 8,878,414 | B2 | 11/2014 | Mourou et al. |
| 9,006,953 | B2 | 4/2015 | Wei et al. |
| 2003/0193260 | A1 | 10/2003 | Reiter, Jr. et al. |
| 2013/0056672 | A1 | 3/2013 | Johnston et al. |
| 2014/0035423 | A1 | 2/2014 | Veronesi et al. |
| 2015/0194846 | A1 | 7/2015 | Puetz et al. |

OTHER PUBLICATIONS

Chaudhury, et al, "Low silicon non-grain-oriented electrical steel: Linking magnetic properties with metallurgical factors," Journal of Magnetism and Magnetic Materials, vol. 313, 2007, pp. 21-28.
De Wulf, et al, "Magnetic properties of Fe 100-x-y Si x P y (0x4, 0y0, 6) soft magnetic composites prepared by diffusion sintering," Journal of Applied Physics, vol. 93, No. 10, 2003, pp. 7109-7111.
Lee, et al, "Characteristic Comparison Between the Spiral and the Lamination Stator in Axial Field Slotless Machines" IEEE Transactions on Magnetics, vol. 45, No. 10, Oct. 2009, pp. 4547-4549.
Lindner, et al, "Screen Printed Components for Electrical Energy Conversion Systems," 6th International Conference on Magnetism and Metallurgy (WMM '14), Cardiff (UK), Jun. 17-19, 2014.
Patterson, et al, "A comparison of Radial and Axial Flux Structures in Electrical Machines," IEEE, 2009, pp. 1029-1035.
Swensen, et al, "Injected 3D Electrical Traces in Additive Manufactured Parts with Low Melting Temperature Metals," 2015 IEEE International Conference on Robotics and Automation (ICRMA), Washington State Convention Center, Seattle, Washington, May 26-30, 2015, pp. 988-995.
Yashiki, et al, "Effect of Hot-Band Grain Size on Magnetic Properties of Non-Oriented Electrical Steels," IEEE Transactions on Magnetics, vol. Mag-23, No. 5, Sep. 1987.
Jassal, et al, Patent Search Report Comparison (Additive Manufacturing for Segmented Electric Machines), Sep. 2015.
Jassal, et al, Patent Search Report Comparison (Method of Fabricating Electric Machine Laminations Using Additive Manufacturing), Sep. 2015.

METHOD OF FABRICATING ELECTRIC MACHINE LAMINATIONS USING ADDITIVE MANUFACTURING

FIELD

The invention relates generally to using an additive manufacturing process to manufacture laminated components for electrical machines.

BACKGROUND

In electrical machines, ferromagnetic parts channel magnetic flux. These parts may be structured as insulated laminas compacted together to form a core of the ferromagnetic part. Lamination and insulation may minimize losses such as eddy current losses which may otherwise represent a significant part of energy loss in an electrical machine. Limitations on the sizes of steel sheets from which laminas are constructed may pose complicating difficulties in assembling multiple laminated parts together to form a single part. More complex topologies may decrease losses, increase magnetic flux density, or both, but are difficult to manufacture with conventional methodologies. Thus, there is a need for an improved method for manufacturing laminated parts for electric machines.

SUMMARY

In one embodiment, a method of making a component of a radial flux electrical machine is provided. The method includes using an additive manufacturing process to manufacture a plurality of laminas and the additive manufacturing process includes applying a beam or beams of energy to a successive plurality of ferromagnetic material particles and fusing them together to form a ferromagnetic helix; disposing an insulating material on the ferromagnetic helix; compressing the ferromagnetic helix to form a compressed ferromagnetic helix; and fixing the compressed ferromagnetic helix.

In another embodiment, a method of making a component of an axial flux electrical machine is provided. The method includes using an additive manufacturing process to manufacture a plurality of laminas and the additive manufacturing process comprises applying a beam or beams of energy to a successive plurality of ferromagnetic material particles and fusing them together to form a ferromagnetic spiral; disposing an insulating material on the ferromagnetic spiral; compressing the ferromagnetic spiral to form a compressed ferromagnetic spiral; and fixing the compressed ferromagnetic spiral.

In a further embodiment, a method of making a component of a transverse flux electrical machine is provided. The method includes using an additive manufacturing process to manufacture a ferromagnetic part and the additive manufacturing process comprises applying a beam or beams of energy to a successive plurality of ferromagnetic material particles and fusing them together to form the ferromagnetic part; wherein the ferromagnetic part comprises a longitudinal axis and guides for magnetic flux that are oriented transversely to a circumference around said longitudinal axis.

DRAWINGS

These and other features, aspects, and advantages of the present invention will become better understood when the following detailed description is read with reference to the accompanying drawings, wherein.

DETAILED DESCRIPTION

Embodiments of the present invention are directed to a method of using an additive manufacturing process to manufacture ferromagnetic parts for use in radial, axial, or transverse flux electromagnetic machines. Using an additive manufacturing process to manufacture such parts presents many desirable advantages, including the ability to increase flux density in parts so manufactured, minimizing eddy current losses, and permitting manufacture of ferromagnetic parts with complex topologies in a wider range of sizes with greater ease than enabled by conventional manufacturing processes.

In the following description and the claims that follow, whenever a particular aspect or feature of an embodiment of the invention is said to include, comprise, or consist of at least one element of a group and combinations thereof, it is understood that the aspect or feature may include, comprise, or consist of any of the elements of the group, either individually or in combination with any of the other elements of that group. Similarly, the singular forms "a", "an" and "the" include plural referents unless the context clearly dictates otherwise.

Approximating language, as used herein throughout the specification and claims, may be applied to modify any quantitative representation that could permissibly vary without resulting in a change in the basic function to which it is related. Accordingly, a value modified by a term or terms, such as "about" may not be limited to the precise value specified, and may include values that differ from the specified value. In at least some instances, the approximating language may correspond to the precision of an instrument for measuring the value. In the present discussions it is to be understood that, unless explicitly stated otherwise, any range of numbers stated during a discussion of any region within, or physical characteristic of, is inclusive of the stated end points of the range.

Figure 1:
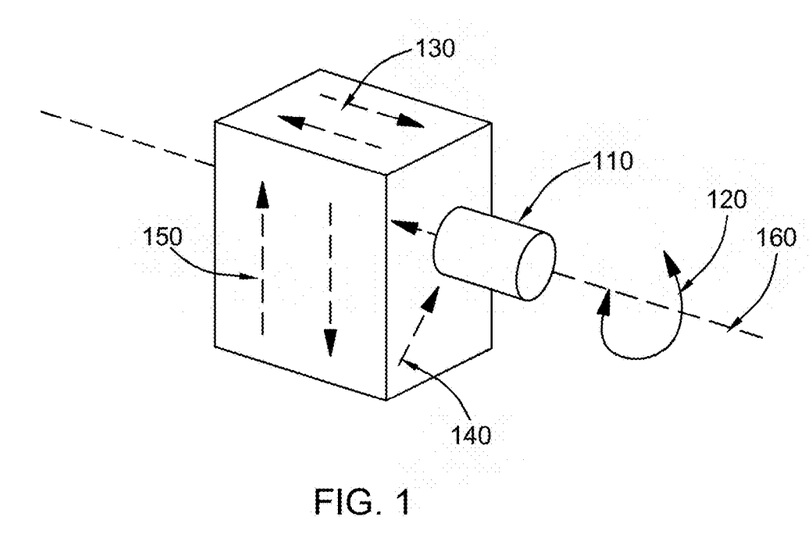
FIG. 1 is an illustration of different directions of magnetic flux in different types of electromagnetic machines.

Electromagnetic machines function in part by inducing the flow of magnetic flux through ferromagnetic components. For example, a magnet may move in proximity to a ferromagnetic part, inducing magnetic flux to flow along flux lines in the ferromagnetic part. Depending on a direction in which flux flows relative to a direction of movement of a magnet, the machine may be considered a radial flux machine, an axial flux machine, or a transverse flux machine. FIG. 1 is a diagrammatic representation of different directions of magnetic flux lines in electromagnetic machines of different topologies with regard to rotation 120 of a rotor 110. In an axial flux machine, axial magnetic flux lines 130 are oriented generally parallel to an axis of rotation 160 of a rotor 110. In radial flux electromagnetic machines, radial magnetic flux lines 140 are oriented generally radially with respect to an axis of rotation 120 of a rotor 110. And in transverse flux electromagnetic machines, transverse magnetic flux lines 150 are oriented generally tangentially to a circumference around an axis of rotation 120 of a rotor 110.

Use of an electromagnetic machine with a radial, axial, or transverse flux topology may be preferable for different applications depending on many factors, such as relative power output, size, expense of manufacture, longevity, operable temperature, or other factors specific to certain applications. An aspect of electromagnetic machine function which may disadvantageously affect performance includes losses. Losses, such as eddy current losses in alternating current machines, may be induced in ferromagnetic parts and lead to a loss of efficiency. Eddy current losses may be advantageously reduced by use of a ferromagnetic core made of laminations of ferromagnetic material coated with an insulating material then packed together to form a core stack. Conventionally, laminations are stamped from sheets of a ferromagnetic material such as electrical grade steel, coated with an insulating material, arranged in a stack, and clamped or fastened together. However, this process can be cumbersome, posing difficulties in stamping individual laminations that conform to the overall desired topology and aligning and clamping them together, as well as difficulties in providing for any cooling or other thermal regulatory channels in the core that may be needed as well as for placement of windings to carry electrical current, as well as high costs, inefficiencies, and lack of flexibility in choice of topology or size.

The present invention includes a method for manufacturing ferromagnetic parts of electromagnetic machines of various topologies. An additive manufacturing process may be used to create a continuous ferromagnetic part. Such part may be manufactured so as to possess insulated laminas so as to minimize eddy current losses but also for such laminas to be formed in connection with each other so that subsequent attachment or clamping of laminas to each other may be reduced, minimized, or unnecessary. Portions of a ferromagnetic part through which magnetic flux lines are channeled, or active portions, may be manufactured as connected to portions of ferromagnetic parts through which no or minimal magnetic flux lines flow during operation of an electromechanical machine containing such part, or structural portions that function in part to hold active portions in the proper orientation, topology, or configuration, thereby resulting in the manufacture of a single part comprising active and structural parts. Also, channels for temperature regulation, spaces for windings, or other conformational characteristics may be built in to the part so manufactured as the part is being produced, simplifying the ultimate assembly of an electromechanical machine containing such part. Using an additive manufacturing process in accordance with the present invention also allows for production of parts with complex topologies which are undesirably complex or cost prohibitive to manufacture according to conventional methods.

According to the current invention, a thickness of an insulating layer on a lamina may be very thin, on the order of 10 μm, or 20 μm, or less. A consequence of applying thinner layers of insulation to laminas of a laminated electromagnetic core is an increase in the volume fraction of ferromagnetic material of such core without a concomitant decrease in the density of laminas, or number of laminas per volume of the core part. This increased relative fraction of ferromagnetic material, referred to as stacking factor, may beneficially improve performance, efficiency, or other operating parameters of an electromagnetic machine.

In accordance with the present invention, it is possible to obtain a stacking factor of 97% or 98% because of the low volume of insulation required to adequately insulate adjoining laminas, with insulation accounting for only 2%-3% of the volume of the ferromagnetic core part. The high stacking factor attainable with the present method is an improvement of other methods such as where soft metal composites are used, because manufacturing a ferromagnetic part from soft metal composites requires incorporating insulation within and throughout the part leading to a higher relative volume taken up by insulation than is attainable with the present invention.

Additive manufacturing is a process whereby a source of energy such as a laser beam or electron beam is applied to a portion or portions of a layer of powder or granular material causing the powder or granules to fuse or bind to each other. After fusing a portion of powder or granules together, another layer of powder or granules is deposited over the first layer, and a portion thereof is also fused to itself as well as to a portion or portions of the layer underneath which was previously fused. This process is repeated successively, on layer after layer of powder or granular material. The laser or electron beam or other energy source is directed towards, and fuses, sinters, or melts such portion or portions of successive layers as to create a three-dimensional object. A computer model or program may be used to orient the application of laser or electron beam, or other energy source, to each successive layer, as well as the energy source's intensity, size, and duration.

For example, a laser source, electron beam, or source of other energy may be directed to a scanner and the scanner may implement instructions from a computer to direct the placement, energy intensity, size, and duration of energy application to a portion or portions of layer of powder or granular material in accordance with a computer model or program representing the ultimate three-dimensional shaped part desired. Examples of additive manufacturing processes that may be used in accordance with the present invention include selective laser melting, selective laser sintering, direct metal laser sintering, electron beam melting, or other methods comprising directing an energy beam towards powder or granular material to fuse, agglomerate, melt, sinter, or otherwise attached a portion of particles or granules to each other, as well as to a portion or portions of underlying material which has already been fused, agglomerated, melted, sintered, or otherwise attached together.

Figure 2:
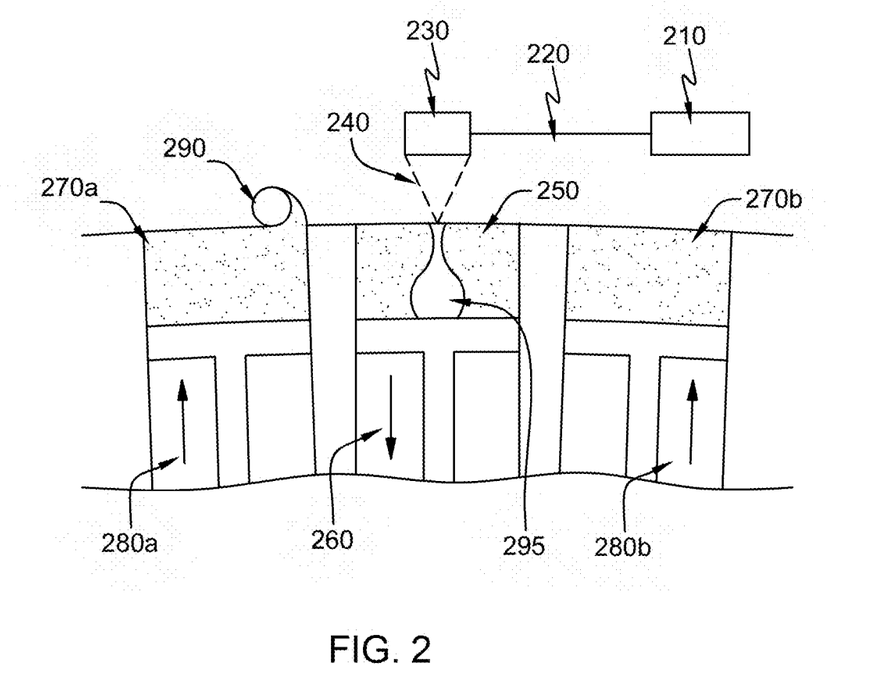
FIG. 2 is a schematic drawing of a system for manufacturing an article using an additive manufacturing process.

A general example of a system for additive manufacturing of a part is presented in FIG. 2. In this example, an energy beam source 210 directs an energy beam 220 towards a scanner 230. The scanner 230, typically in response to instructions received from a computer (not shown), redirects the energy beam 240 towards a surface of a bed 250 of powder or granular material. The location, intensity, size, or other parameters of the energy beam 240 directed to the surface of the bed 250 of powder or granular material may be adapted by the scanner 230 and/or energy beam source 210 so as to fuse, sinter, agglomerate, or melt (referred to generally herein as fusing) powder particles or granules of a portion thereof to each other. When fusion of such portion is completed, the bed may be moved downward 260, and another layer of powder or granular material deposited thereupon.

For example, a source 270a of powder or granular material may be raised upward 280a and a roller 290 or other instrumentality such as a swiping blade (not shown) may push a layer of more powder or granular material onto the bed 250 of powder or granular material. Another round of fusing a portion or portions of particles or granules of the newly deposited layer to each other, and to a portion of the fused material therebelow, would follow. The process is repeated, with the bed 250 of powder or granular material lowered, the source 270a of powder or granular material raised upward 280a, and a new layer of powder or granular material pushed onto the bed 250 of powder or granular material by the roller 290. A portion of the new layer of such particles or granules would be fused to each other, and to a portion of the fused material therebelow. In some examples, there may be a second source 270b of powder or granular material be raised upward 280b and powder or granular material pushed therefrom by the roller 290 onto the bed 250 of powder or granular material between fusion steps in alternation with the source 270a of powder or granular material. Repetition of depositing a new layer of powder or granular material and fusion of a portion or portions thereof, layer by layer, results in manufacture of a three-dimensional part 295.

Additive manufacturing may be used to manufacture complex topologies of parts, such as ferromagnetic parts of electromechanical machines in accordance with the present invention. Custom parts with curved, irregular geometries, as well as cooling channels, slots or spaces to accommodate windings, or notches or spaces to accommodate bindings to compress laminas or individually manufactured parts together following manufacture, are possible. A desired configuration of a part may be programmed into a general purpose computer to direct the energy beam source 210 and/or scanner 230, and/or other components of the additive manufacturing system, as to the application of an energy beam relative to the positioning of a bed 250 of powder or granular material to result in the production of a part with the desired configuration. Fusion of particles may be effected by sintering, which entails application of energy to raise the temperature of a portion of powder or granular materials, but not as high as their melting temperature, to cause them agglomerate, or by melting, which entails raising the portion of powder or granular materials to above their melting temperature. Other than controlling the energy beam source 210 and/or scanner 230, a computer may also be used to control lowering 260 of the bed 250 of powder or granular material, raising 280a and 280b a source 270a and 270b of powder or granular material, or operation of the roller 290 as well as positioning of the bed 250 of powder or granular material. The energy beam 220 may be a laser beam, an electron beam, or some other beam of electromagnetic radiation or other energy.

Any of a variety of ferromagnetic powder or granular materials may be used, depending on the characteristics desired in a part manufactured in accordance with the present invention. Ferromagnetic metal and metal alloys, containing or not containing non-metallic constituents, may be used. For example, nickel-iron, silicon-iron, iron, iron-cobalt, ferritic steel, or combinations thereof may be used. Powder or granular material comprising other ferromagnetic material may also be used. Particulate or granular ferromagnetic material is commercially available or can be manufactured to accommodate the needs of a particular application. Powdered or granular materials with an average grain size of anywhere from between approximately 10 μm to approximately 40 μm may be used, as may materials with larger or smaller average grain sizes than these.

Figure 3:
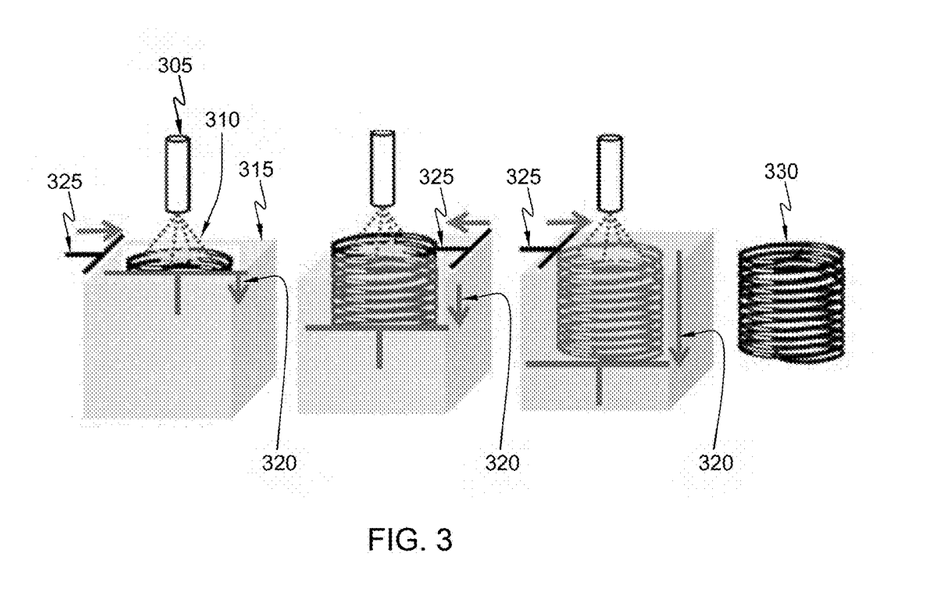
FIG. 3 is a schematic drawing of a system for using an additive manufacturing process to manufacture a helical part for an electromagnetic machine in accordance with the present invention.

An example of using an additive manufacturing method to manufacture a ferromagnetic part for an electromagnetic machine in accordance with the present invention is illustrated in FIG. 3. Only some components of an additive manufacturing system are shown in FIG. 3 for purposes of simplicity but it would be understood that other components, including those illustrated in FIG. 2 and others, may also be included. In FIG. 3, a scanner 305 directs an energy beam 310 towards portions of a surface of a bed 315 of ferromagnetic powder or granular material. The energy beam 310 fuses a portion of the ferromagnetic powder or granular material together, whereupon the bed 315 of ferromagnetic powder or granular material is lowered and a fresh layer of ferromagnetic powder or granular material is deposited thereupon by a swiping blade 325 or other instrumentality. By applying successive steps of fusing and depositing, a three-dimensional part 330 is manufactured. In this example, the three dimensional part is generally helical in shape.

In another aspect, after manufacturing a three-dimensional part via an additive manufacturing process, surfaces thereof may be coated with an insulating material. The insulating material between adjacent laminas may prevent or reduce losses, particularly eddy current losses. Insulating material may be deposited on surfaces of a laminated a ferromagnetic part by any effective method, such as spray coating the insulating material on said a part, submerging a part in the insulating material then removing the part and allowing a residual layer of insulating material on the part to dry, or vacuum impregnating a part with a layer of insulating material, as several non-limiting examples. Various types of insulating material are known in the art as useful in insulating laminas for use in a laminated ferromagnetic part for an electromagnetic machine. Some non-limiting examples include magnesium oxide and organic varnish.

In a further aspect, a ferromagnetic part comprising laminations manufactured in accordance with the present invention may be compressed to cause apposition of successive laminas to each other. Compression may be effected manually or by the use of a machine. A layer of insulating material may or may not have been deposited before compression, although if the avoidance of eddy currents is a concern, insulation before compression may be preferable. After compression, a part may be fixed in a compressed state such as with the application of a binding or bindings or a clamp or clamps to hold the laminas in tight apposition to each other. A part may have been manufactured with slots or indentations where the attachment of bindings or clamps is intended. As mentioned above, other aspects of a part may also be incorporated during manufacture such as the inclusion of channels for regulating temperature of the part during operation of an electromagnetic machine in which it is used.

EXAMPLES

The following examples are presented to further describe the techniques, but should not be read as limiting, because variations still within the scope of embodiments of the present invention will be apparent to those skilled in the art.

Figure 4A:
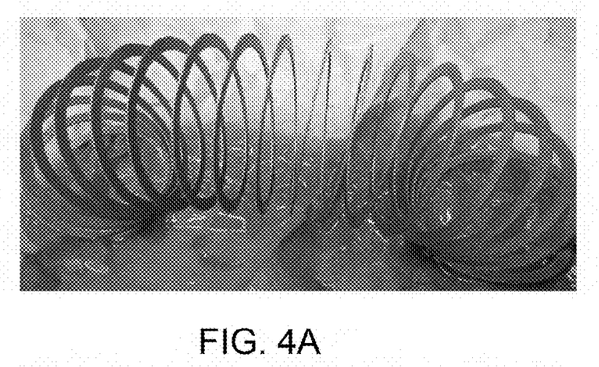
FIGS. 4A, 4B, 4C, and 4D are photographic images of a helical ferromagnetic part for a radial flux electromagnetic machine manufactured by an additive manufacturing process in accordance with the present invention.
Figure 4B:
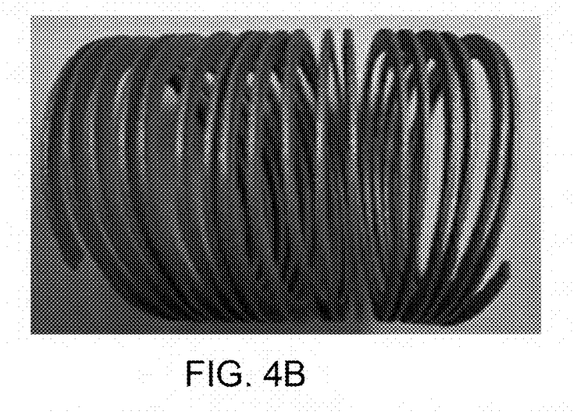

In an example, an additive manufacturing process is used to manufacture a helical ferromagnetic part of an electromagnetic machine. A general method for producing such part was described above as schematically diagrammed in FIG. 3. Using the general method depicted in FIG. 3, granular martensitic steel was used as the starting material, with an average grain size of approximately 20 µm. A helical ferromagnetic part was manufactured by an additive manufacturing method comprising laser melting. A computerized configuration of a part was provided and used to direct the application of laser beams to successive layers of granular martensitic steel to form a martensitic steel helix. Photographic images of a ferromagnetic helix manufactured in accordance with this Example are shown in FIGS. 4A-4B.

Figures 4C, 4D:
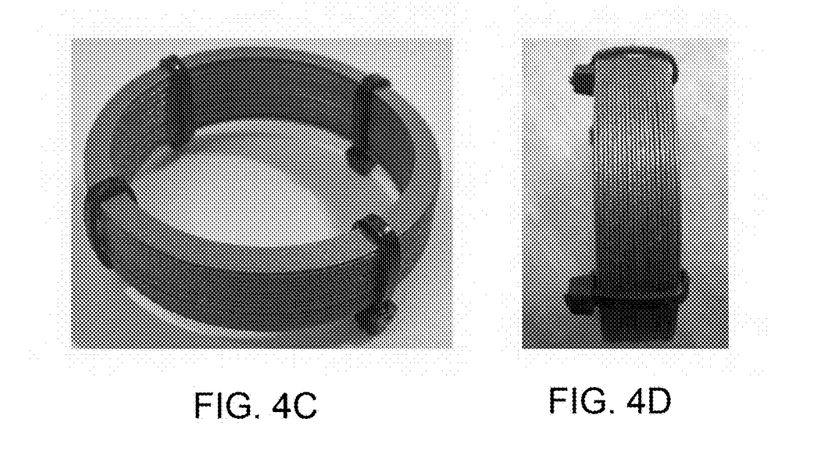

After synthesizing the helical ferromagnetic part by laser sintering, a layer of a mixture of butyl acetate and ethyl acetate varnish insulation was spray coated onto the surfaces thereof and allowed to air dry. Once the layer of insulating material was dried, the part was compressed into a packed helix then fixed in a compressed state by being bound with plastic zip ties. Photographic images of a ferromagnetic helix fixed in a compressed state in accordance with the present invention are shown in FIGS. 4C-4D. When this ferromagnetic part consisting of insulated laminas is placed around a magnetic rotor, with the axis of rotation of the rotor being parallel to an axis through the open center of the ferromagnetic part, rotation of the magnetic rotor induces magenetic flux lines that are radial to the axis of rotation of the rotor, as may be adapted for use in a radial flux electromagnetic machine. Skilled artisans would recognize that other exemplar topologies of ferromagnetic parts for use in radial flux machines could also be manufactured in accordance with the present invention.

Ferromagnetic particles of granules other than martensitic steel may be used as starting material. Such ferromagnetic materials may be metals or metal alloys and may contain non-metallic constituent such as carbon or silicon, or others. Non-limiting examples include iron, nickel-iron, silicon-iron, iron-cobalt, ferritic steel, or combinations thereof. Combinations of ferromagnetic and non-ferromagnetic particles or granules may be mixed together and used in an additive manufacturing process to create a part that is overall ferromagnetic on account of a distribution of ferromagnetic components throughout its structure.

Figure 5:
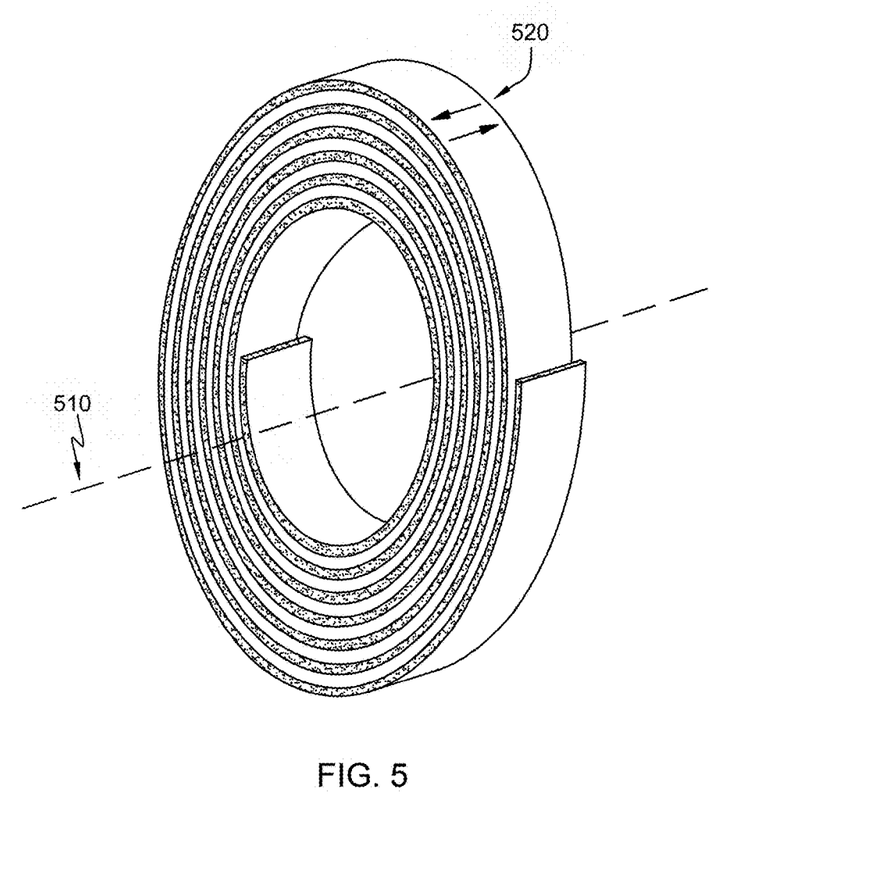
FIG. 5 is a schematic drawing of a spiral ferromagnetic part for an axial flux electromagnetic machine manufactured by an additive manufacturing process in accordance with the present invention.

Another example of a ferromagnetic part that may be manufactured in accordance with the present invention is shown in FIG. 5. FIG. 5 shows a spiral ferromagnetic part. Herein, a spiral ferromagnetic part is distinguished from a helical ferromagnetic part, such as is illustrated in FIG. 3 and FIGS. 4A-4D. A spiral ferromagnetic part comprises a curved strip of ferromagnetic material disposed around a center wherein a radius of the curvature of the strip continuously decreases with the progression from one end of the strip to the other. After manufacture of a ferromagnetic spiral, surfaces of the part may be insulated, the spiral compressed, and the compressed spiral fixed in a compressed state. If such a ferromagnetic spiral were disposed adjacent to a disc or ring comprising one or more magnets which were spun about an axis of rotation parallel to a central axis of the spiral 510, magnetic flux lines 520 would be induced within the laminas of the spiral that are generally parallel to the axis of rotation of the disc or ring of magnets.

Figure 6A:
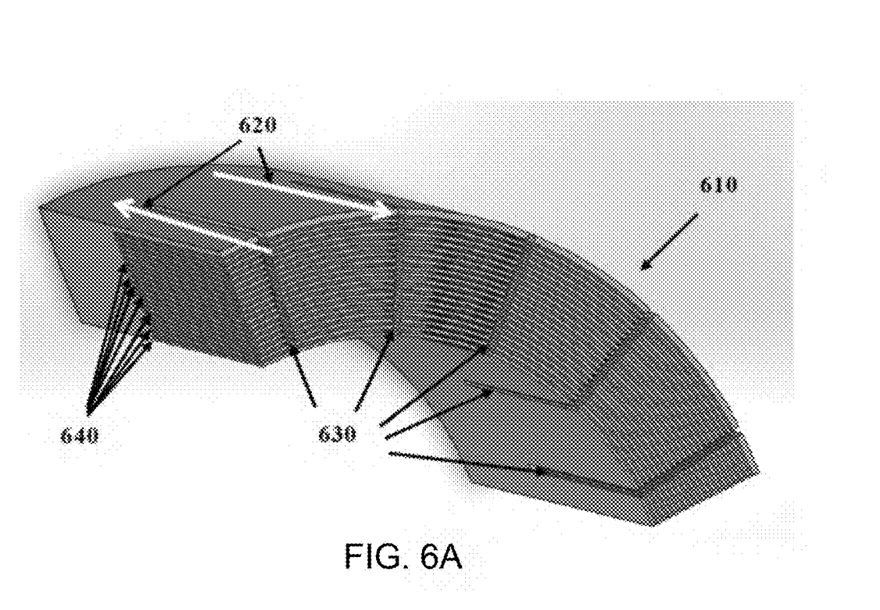
FIGS. 6A and 6B are a drawing and photograph, respectively, of a an arcuate portion of a laminated ferromagnetic part for use in an axial flux electromagnetic machine manufactured in accordance with the present invention.
Figure 6B:
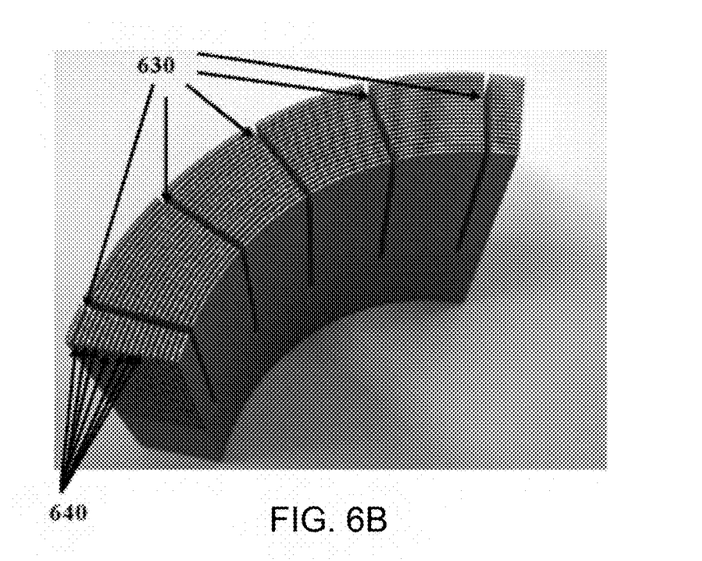

Skilled artisans would recognize that other exemplar topologies of ferromagnetic parts for use in axial flux machines could also be manufactured in accordance with the present invention. One such nonlimiting example is shown in FIGS. 6A-6B. FIG. 6A shows a drawing of an arcuate portion of a laminated ferromagnetic part 610 for use in an axial flux electromagnetic machine with magnetic flux lines 620 indicated. An FIG. 6B is a photograph of such an arcuate portion of a laminated ferromagnetic part 610 manufactured by an additive manufacturing process as disclosed herein in accordance with the present invention. As disclosed herein, a layer of insulation may be deposited on an arcuate portion of a laminated ferromagnetic part 610, or on portions thereof including but not limited to laminas. A plurality of arcuate portions of a laminated, optionally insulated ferromagnetic part 610 could be connected end-to-end to form an annular ferromagnetic part of an electromagnetic machine. Alternatively, an annular ferromagnetic part of an electromagnetic machine may be manufactured, and optionally a layer of insulation disposed thereon, in accordance with the present invention rather than such annular ferromagnetic part being assembled from a plurality of laminated ferromagnetic parts 610.

If an annular ferromagnetic part, manufactured as a single part or assembled from a plurality of arcuate portions of a laminated ferromagnetic part 610, were disposed adjacent to a disc or ring comprising one or more magnets which were spun about an axis of rotation parallel to a central axis of the annular ferromagnetic part, magnetic flux lines 620 may be induced within the laminas of the spiral that are generally parallel to the axis of rotation of the disc or ring of magnets, in accordance with an axial flux topology. Slots 630 in an annular ferromagnetic part may guide magnetic flux lines 620. Optionally, laminations 640 may reduce eddy current losses, whereas their close apposition may allow for an increased stacking factor of such a part.

Figure 7:
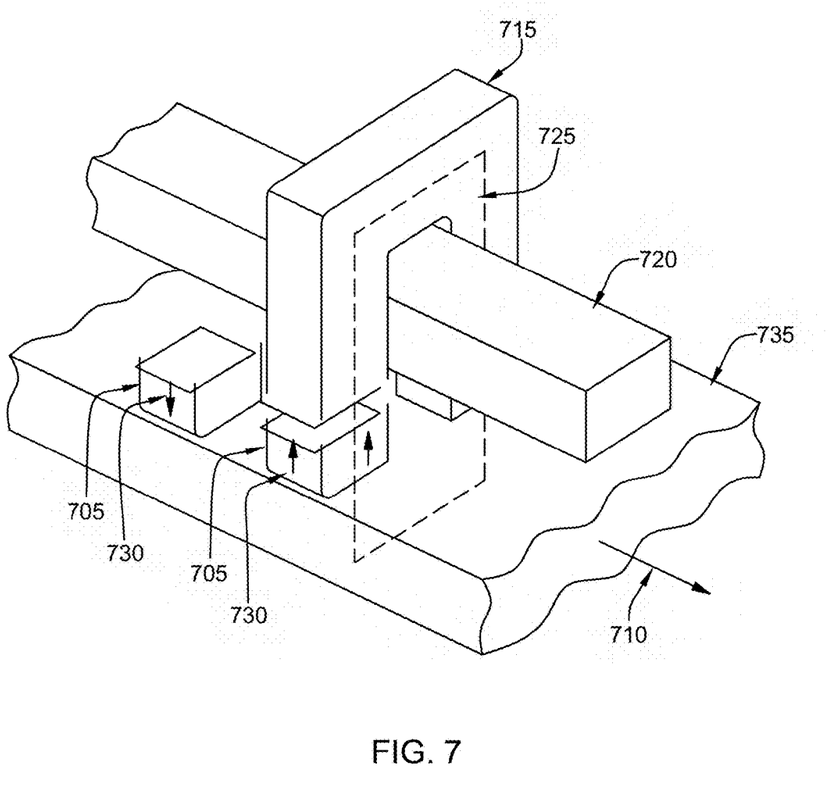
FIG. 7 is a schematic diagram of a general topology for a ferromagnetic part for a transverse flux electromagnetic machine.

Other examples of more complex topologies of ferromagnetic parts for electromagnetic machines that can be manufactured in accordance with the present invention are diagrammatically shown in FIG. 7 and FIGS. 8A-8D. FIG. 7 shows a general diagram for a simple transverse flux electromagnetic machine topology. Magnets 705 with alternating polarity 730 are situated on substrate 735. A ferromagnetic part 715, manufactured in accordance with the present invention, is disposed around winding 720. When substrate 735 and magnets 705 move in direction 710, magnetic flux lines 725 are created in ferromagnetic part 715. If substrate 735 is annular, encircled by a ring comprising a plurality of ferromagnetic parts 715, and movement 710 comprised rotation of magnets 715 around an axis of rotation at the radial center of the annular substrate 710 (i.e., aligned with a longitudinal axis therethrough), a direction of magnetic flux lines 725 would comprise a direction that is generally tangential to a circumference around the axis of rotation, such as may be employed in a transverse flux electromagnetic machine topology.

Numerous examples of transverse flux electromagnetic machines, including those comprising variations of the topology illustrated if FIG. 7, or other topologies where magnetic flux is guided in a direction generally tangential to a circumference around an axis of rotation between a ferromagnetic part relative to a magnet, are also known in the art. Any of the examples presented herein or others may be manufactured by an additive manufacturing process in accordance with the present invention.

Figure 8A:
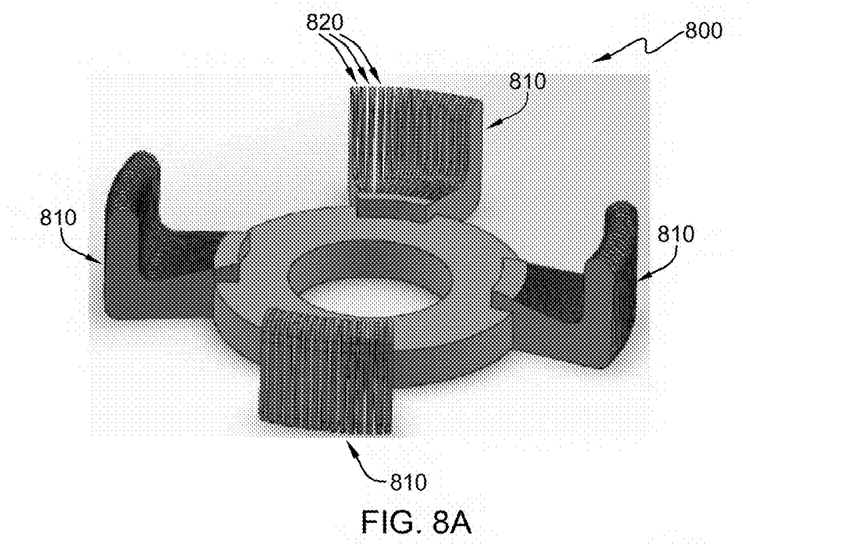
FIGS. 8A, 8B, 8C, and 8D are schematic drawings of ferromagnetic parts for transverse flux electromagnetic machines manufactured by an additive manufacturing process in accordance with the present invention.
Figure 8B:
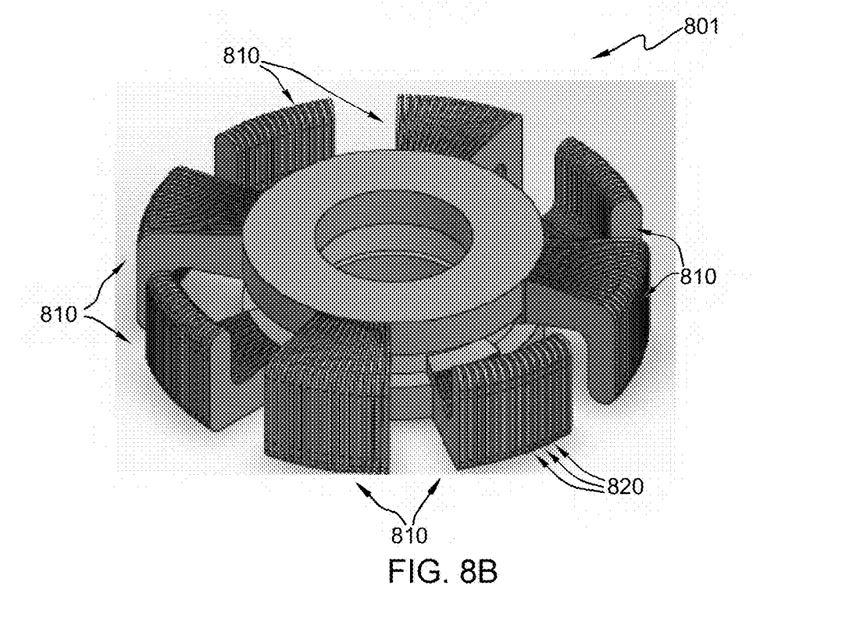

An example of a ferromagnetic part for a transverse flux electromagnetic machine that may be manufactured in accordance with the present invention is shown if FIGS. 8A-8B. FIGS. 8A-8B are a diagrammatic representation of a transverse flux machine topology referred to as a claw pole. One half of a ferromagnetic part of a claw pole 800 is shown in FIG. 8A and two halves of a ferromagnetic claw pole assembled into one ferromagnetic claw pole component 801 is shown in FIG. 8B. In this example, the one ferromagnetic claw pole component 801 comprises eight claws 810, four attached to each half of a ferromagnetic part of a claw pole 800. During operation, a magnet, which may be situated within the ferromagnetic claw pole component 801, between each half of a ferromagnetic part of a claw pole 800, is rotated around an axis of rotation centered at the radial center of the ferromagnetic claw pole component 801 (i.e., aligned with a longitudinal axis through the ferromagnetic claw pole component 801). Such rotation causes magnetic flux lines to flow, in a portion of claws 810 that is oriented perpendicular to a plane comprising the central ring of the at their distal ends that is parallel to an axis of rotation of the magnet ferromagnetic claw pole component 801, in a direction generally tangential to a circumference around an axis of rotation of the magnet.

Unlike in conventional claw pole topologies, the ferromagnetic claw pole component 801 illustrated in FIG. 8B comprises laminations 820 within claws 810. The laminations, upon which a layer of insulation may be disposed, may prevent losses, such as eddy current losses, in the poles, thereby enhancing the efficiency of a ferromagnetic claw pole component 801 compared to a claw pole whose claws do not comprise laminations. The complex laminated topology illustrated in FIG. 8A, difficult to manufacture by conventional methods, may be manufactured by a method in accordance with the present invention. According to the present invention, a half of a ferromagnetic part of a claw pole 800, or ferromagnetic claw pole component 801, may be manufactured by an additive manufacturing process. Such process may eliminate the need to connect individual substituents of a half of a ferromagnetic part of a claw pole 800, or ferromagnetic claw pole component 801, to each other to assemble a half of a ferromagnetic part of a claw pole 800, or ferromagnetic claw pole component 801, respectively, because a complete half of a ferromagnetic part of a claw pole 800 or ferromagnetic claw pole component 801 could be manufactured in one piece by an additive manufacturing process in accordance with the present invention. Individual components could also be manufactured and assembled together after an additive manufacturing process. As described above, an insulating layer could also be deposited on laminas 820 of claws 810 according to known methods.

Figure 8C:
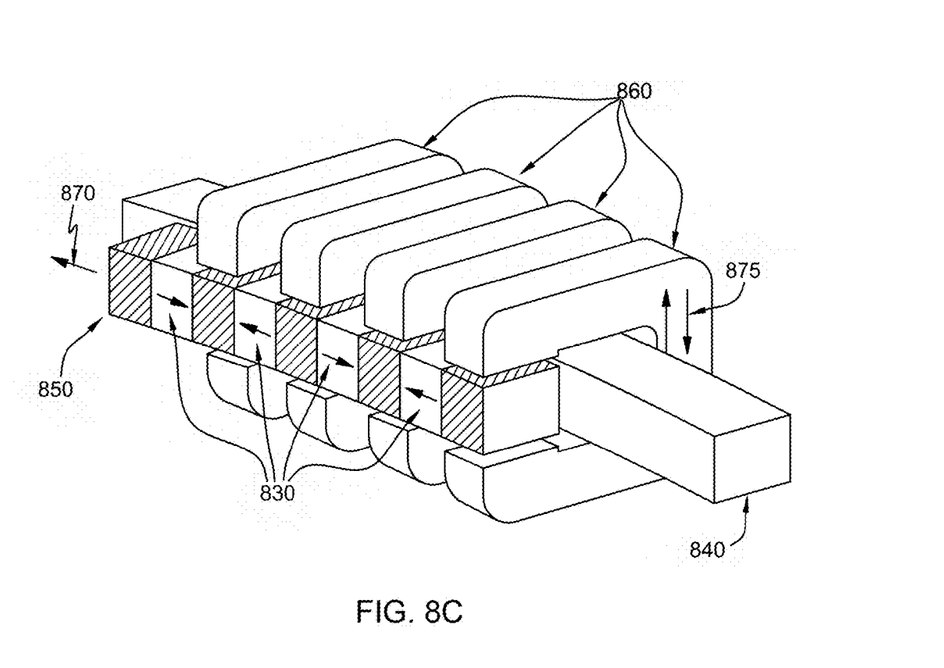
Figure 8D:
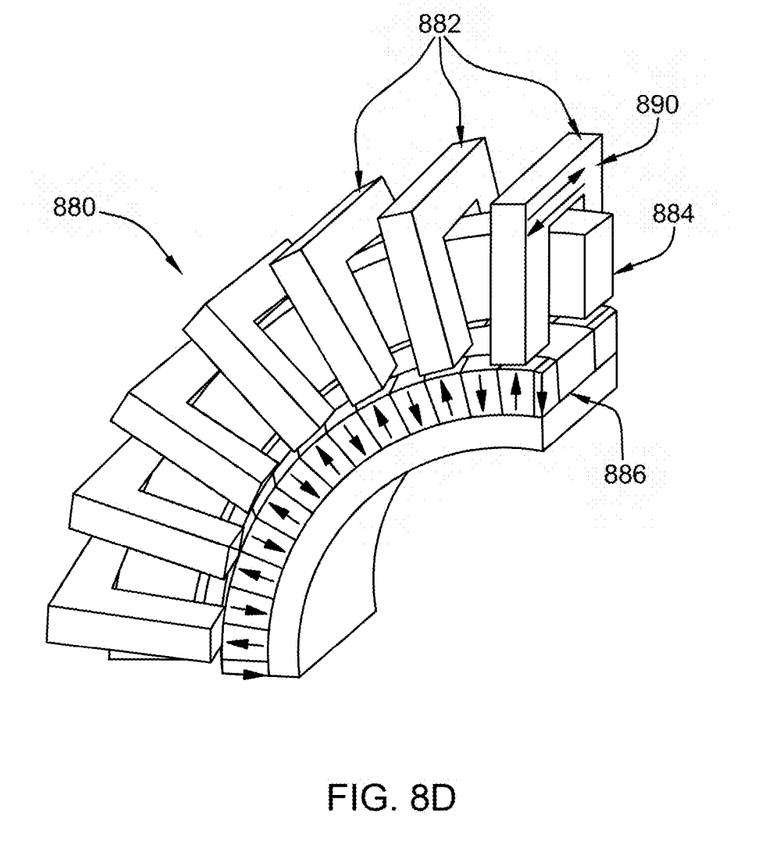

Other, non-limiting examples of types of transverse flux electromagnetic machines that can be created in accordance with the present invention are schematically illustrated in FIGS. 8C-8D. In a transverse topology illustrated in FIG. 8C, C-shaped ferromagnetic parts 860 curve around a winding 840. Laminated magnetic component 750 is oriented between the open ends of C-shaped ferromagnetic parts 860. In this example, laminated magnetic component 850 comprises magnets whose polarities 830 alternate successively. In this example, if magnetic component 850 were moved in direction 870, magnetic flux lines would be created along portions of the C-shaped ferromagnetic parts 860 distal to the C-shaped opening 875. This direction of magnetic flux lines 875 relative to a direction of movement of magnetic component 870 is such as would be employed in a transverse flux topology of a ferromagnetic machine (e.g., if the winding 840, magnetic component 850, and series of C-shaped ferromagnetic parts 860 were extended along a curvature at each end to create an annular structure). A topology for a transverse electromechanical machine illustrated in FIG. 8C may be manufactured by an additive manufacturing process in accordance with the present invention as described above. C-shaped ferromagnetic parts 860 may be thereby manufactured either separate from or connected to each other, depending on the preferred method of assembly of a desired machine. C-shaped ferromagnetic parts 860 may optionally comprise laminations (not shown), which may optionally comprise a layer of insulation deposited thereupon.

Another topology for a transverse flux electromagnetic machine is illustrated in FIG. 8D. For simplicity of presentation, only one quarter 880 of a complete annular structure is shown in FIG. 8D. Ferromagnetic parts 882 are disposed around winding 884 and in apposition to magnetic component 886. Arrows within magnetic component 886 indicate magnets with successively alternating polarity. The complete annular structure of which quarter 880 is a part forms a circumference around a radial center. Magnetic component 886 is rotated relative to ferromagnetic parts 882 with an axis of rotation centered at the radial center of the complete annular structure (i.e., along a longitudinal axis of a complete annular structure of which one quarter 880 is a part). Such motion of magnetic component 886 relative to ferromagnetic parts 882 causes magnetic flux to flow at the outer rims of the ferromagnetic parts 882 in directions indicated by arrow 890, i.e., generally tangential to a circumference around a rotational axis of magnetic component 886 relative to ferromagnetic parts 882, characteristic of a transverse flux topology for an electromagnetic machine. The topology illustrated in FIG. 8D may be manufactured in accordance with the present invention as described above. Ferromagnetic parts 882 may be manufactured separately from each other and assembled together subsequent to an additive manufacturing process, or may be manufactured connected together as a single component as part of an additive manufacturing process. Ferromagnetic parts 882 may also comprise laminations (not shown) and laminations may optionally comprise a layer of insulation disposed thereupon. Skilled artisans would recognize that other exemplar topologies of ferromagnetic parts for use in transverse flux machines could also be manufactured in accordance with the present invention.

It should be appreciated by those with experience in this field that there are topologies of radial flux, axial flux, and transverse flux electromagnetic machines that may be manufactured in accordance with the present invention other than those specifically illustrated herein. Any of the examples discussed herein, or others, could be modified to incorporate cooling channels, notches, slots, holes, indentations, or other structural features to accommodate windings, attachment of individual parts to each other, or binding compressed parts, could also be implemented by additive manufacturing in accordance with the present invention.

What is claimed is:

1. A method of making a component of a radial flux electrical machine comprising:
   using an additive manufacturing process to manufacture a plurality of laminas wherein said additive manufacturing process comprises applying a beam or beams of energy to a successive plurality of ferromagnetic material particles and fusing together the successive plurality of ferromagnetic material particles to form a ferromagnetic helix;
   disposing an insulating material on said ferromagnetic helix;
   compressing the ferromagnetic helix to form a compressed ferromagnetic helix; and
   fixing the compressed ferromagnetic helix.

2. The method of claim 1 wherein the additive manufacturing process comprises selective laser melting, selective laser sintering, direct metal laser sintering, or electron beam melting.

3. The method of claim 1 wherein the ferromagnetic material particles comprise a metal, a metal alloy, a silicon-metal alloy, a carbon-metal alloy, or any combination of the foregoing.

4. The method of claim 3 wherein the ferromagnetic material particles comprise nickel-iron, silicon-iron, iron, iron-cobalt, ferritic steel, or a combination of one or more of the foregoing.

5. The method of claim 1 wherein a stacking factor of the compressed helix is at least 70 %.

6. The method of claim 5 wherein the stacking factor is at least 85%.

7. The method of claim 6 wherein the stacking factor is at least 95%.

8. The method of claim 6 wherein the stacking factor is at least 95 %.

9. The method of claim 5 wherein the stacking factor is at least 85 %.

10. A method of making a component of an axial flux electrical machine comprising:

using an additive manufacturing process to manufacture a plurality of laminas wherein said additive manufacturing process comprises applying a beam or beams of energy to a successive plurality of ferromagnetic material particles and fusing together the successive plurality of ferromagnetic material particles to form a ferromagnetic spiral;

disposing an insulating material on said ferromagnetic spiral;

compressing the ferromagnetic spiral to form a compressed ferromagnetic spiral; and fixing the compressed ferromagnetic spiral.

11. The method of claim 10 wherein the additive manufacturing process comprises selective laser melting, selective laser sintering, direct metal laser sintering, or electron beam melting.

12. The method of claim 11 wherein the ferromagnetic material particles comprise a metal, a metal alloy, a silicon-metal alloy, a carbon-metal alloy, or any combination of the foregoing.

13. The method of claim 12 wherein the ferromagnetic material particles comprise nickel-iron, silicon-iron, iron, iron-cobalt, ferritic steel, or a combination of one or more of the foregoing.

14. The method of claim 10 wherein a stacking factor of the compressed spiral is at least 70 %.

15. The method of claim 14 wherein the stacking factor is at least 85 %.

16. The method of claim 15 wherein the stacking factor is at least 95 %.

17. A method of making a component of a transverse flux electrical machine comprising:

using an additive manufacturing process to manufacture a ferromagnetic part wherein said additive manufacturing process comprises applying a beam or beams of energy to a successive plurality of ferromagnetic material particles and fusing together the successive plurality of ferromagnetic material particles to form said ferromagnetic part;

wherein said ferromagnetic part comprises a longitudinal axis and guides for magnetic flux that are oriented transversely to a circumference around said longitudinal axis.

18. The method of claim 17 wherein the ferromagnetic part comprises laminas oriented radially to the longitudinal axis, further comprising disposing an insulating material on said laminas.

19. The method of claim 18 wherein a stacking factor of the laminas is at least 70 %.

20. The method of claim 17 wherein the additive manufacturing process comprises selective laser melting, selective laser sintering, direct metal laser sintering, or electron beam melting.

21. The method of claim 17 wherein the ferromagnetic material particles comprise a metal, a metal alloy, a silicon-metal alloy, a carbon-metal alloy, or any combination of the foregoing.

22. The method of claim 21 wherein the ferromagnetic material particles comprise nickel-iron, silicon-iron, iron, iron-cobalt, ferritic steel, or a combination of one or more of the foregoing.

* * * * *